(12) United States Patent
Aben et al.

(10) Patent No.: US 6,404,120 B1
(45) Date of Patent: Jun. 11, 2002

(54) LIGHT TRANSMISSIVE SUBSTRATE CARRYING A LIGHT TRANSMISSIVE LOW OHMIC COATING

(75) Inventors: Gerardus V. A. Aben; Michel J. M. Somers, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/307,157

(22) Filed: May 7, 1999

(30) Foreign Application Priority Data

May 8, 1998 (EP) .............................. 98201547

(51) Int. Cl.[7] .......................... H01J 29/88; H01J 29/89; H01J 31/00
(52) U.S. Cl. ..................... 313/479; 313/478; 313/477 R
(58) Field of Search ................................ 313/479, 478, 313/477 R, 113, 114, 110

(56) References Cited

U.S. PATENT DOCUMENTS 5,742,119 A * 4/1998 Aben et al. .................. 313/479

5,986,400 A * 11/1999 Staring et al. ............... 313/503
6,191,837 B1 * 2/2001 Fujimaki et al. ............. 349/141

FOREIGN PATENT DOCUMENTS

| EP | 0805474 A1 | 11/1997 | ............ H01J/29/86 |
| WO | 9605606 A1 | 2/1996 | ............ H01J/29/88 |

* cited by examiner

*Primary Examiner*—Nimeshkumar D. Patel
*Assistant Examiner*—Karabi Guharay

(57) ABSTRACT

Substrate carrying a mixed organic conductive polymer/transparent metal oxide coating having a thickness between 100 and 600 nm.

The conductive polymer polyethylene-dioxythiophene (PEDOT) is an interesting material to reduce the alternating electric field (AEF) emitted at the front of a colour monitor tube. The processing of the PEDOT is based on chemical polymerisation of ethylenedioxy-thiophene (EDOT) and Fe(III) toluene sulphonate on a face plate of the tube. After the polymerisation is completed, the Fe salt is extracted from the coating by rinsing with an ethanolic solution. If TEOS is used, a hybrid PEDOT/$SiO_2$ film is formed. The specific conductivity is 120 S/cm and the average transmission (380–780 nm) 80% for a layer thickness of about 300 nm.

7 Claims, 4 Drawing Sheets

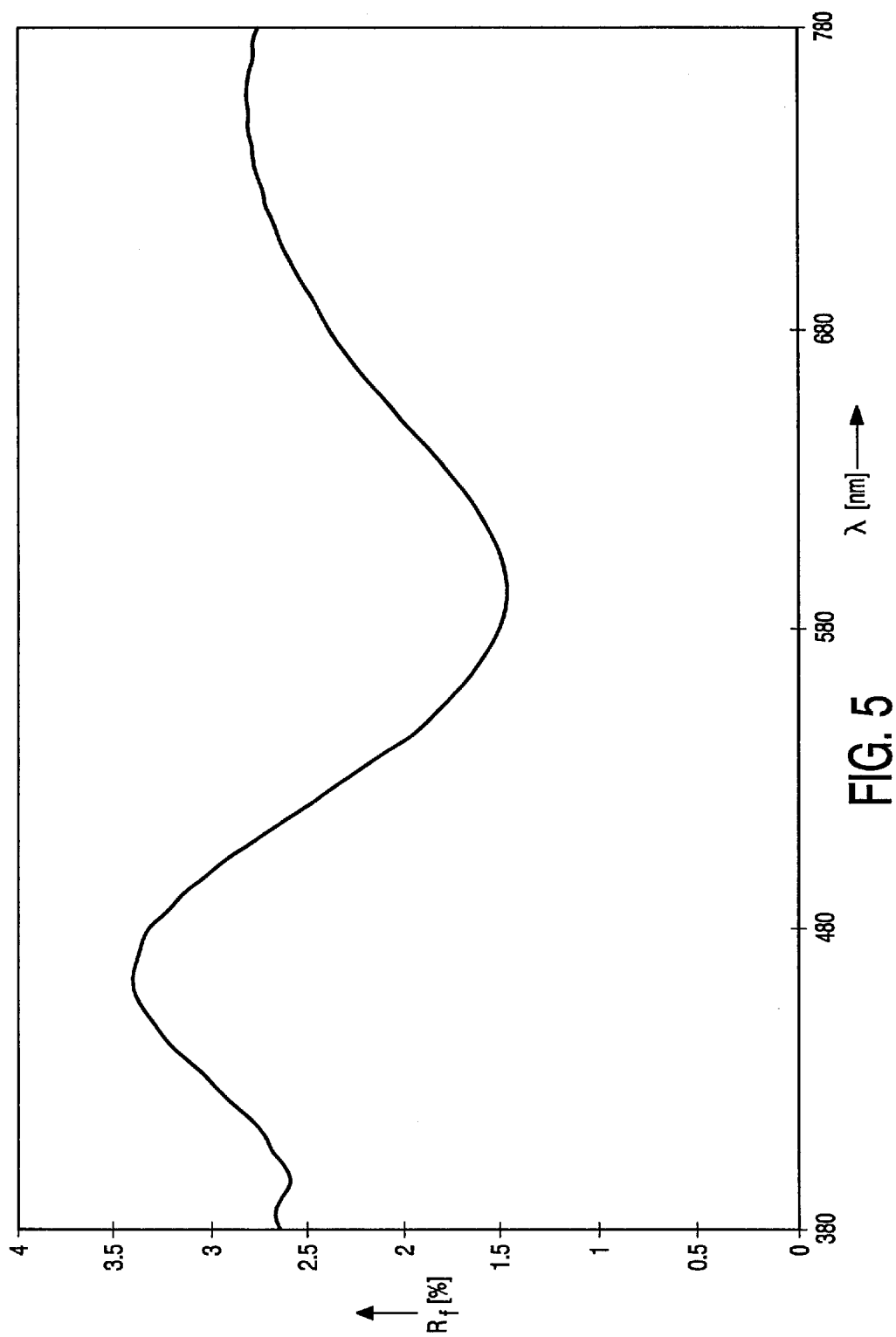

LIGHT TRANSMISSIVE SUBSTRATE CARRYING A LIGHT TRANSMISSIVE LOW OHMIC COATING

FIELD OF THE INVENTION

The invention relates to a light transmissive substrate carrying a light transmissive low ohmic coating and in particular to a cathode ray tube comprising a display screen carrying a light transmissive low ohmic coating.

The invention further relates to a method of manufacturing an low ohmic coating on a substrate.

BACKGROUND AND SUMMARY OF THE INVENTION

Electroconductive coatings are inter alia used as antistatic layers on display screens of display devices, in particular cathode ray tubes (CRTs). Said layers have a sheet resistance, for example, of $10^6$ to $10^{10}$ $\Omega/\square$ and are hence sufficiently electroconductive to ensure that a high electrostatic voltage present on the outside surface of the display screen is removed within a few seconds. Thus, the user does not experience an unpleasant shock if he touches the screen. Besides, the attraction of atmospheric dust is reduced.

Since electromagnetic radiation may be hazardous to health, shielding from electromagnetic radiation is becoming ever more important. Cathode ray tubes, such as display tubes for TVs and monitor tubes, comprise a number of radiation sources which may be hazardous to the user's health if he is exposed to said sources for a long period of time. A substantial part of the electromagnetic radiation generated can be screened off with metal in a simple manner via the housing of the cathode ray tube. However, radiation emitted via the display screen may substantially add to the amount of radiation to which the user is exposed.

This problem is solved by applying a well (electrically) conducting coating on the surface of the display screen. Said coating must also be sufficiently transparent in the wavelength range of from 400 to 700 nm, i.e. the transmission must be at least 60%. A well-known material which can be used for a transparent and well-conducting coating which meets said requirements is indium-doped tin oxide (ITO). Such a layer can be provided by means of vacuum evaporation or sputtering. Said method requires, however, expensive vacuum equipment. ITO layers can also be manufactured by firing spin-coated or sprayed layers of solutions of indium-tin salts. Said firing operation should be carried out at a temperature of at least 300° C. This temperature is much too high to be used with a complete display tube which, in order to preclude damage to parts of the display tube, can withstand temperatures of maximally 160° C.

In German Patent Application DE-A4229192, a description is given of the manufacture of an antistatic coating for, inter alia, a display screen, said coating being made from poly-3,4-ethylene dioxythiophene and a trialkoxysilane to improve the adhesion. By way of example, a coating is manufactured by providing a desalinated aqueous solution of poly-3,4-ethylene dioxythiophene, polystyrene sulphonic acid and 3-glycidoxypropyl trimethoxysilane on a glass plate, whereafter said glass plate is dried. Said poly-3,4-ethylene dioxythiophene is previously prepared by oxidatively polymerizing the monomer 3,4-ethylene dioxythiophene by means of an Fe(III) salt in water in the presence of polystyrene sulphonic acid to preclude precipitation. The antistatic layer thus obtained has a thickness of 0.6 μm (600 nm) and a sheet resistance of 50 k$\Omega/\square$. This sheet resistance is sufficient to bring about an antistatic effect.

A disadvantage of said known layer is that the shielding against electromagnetic radiation is insufficient. Future standards require the electrical field intensity measured at a distance of 0.3 m from the display screen to be maximally 10 V/m in the frequency range 50 Hz–2 kHz and 1 V/m in the frequency range 2–400 kHz. Experiments have shown that in order to meet these requirements the sheet resistance must be below 3 k$\Omega/\square$ and preferably maximally 1 k$\Omega/\square$, taking into account that the sheet resistance may increase with time.

A property of the known antistatic layer is that it is of a blue colour, although it is transparent. Since the sheet resistance is inversely proportional to the layer thickness, a greater layer thickness will lead to a lower sheet resistance. However, as a result thereof the transmission of the layer in the orange-red wavelength range decreases substantially and the blue colour becomes even more intense.

It is an object of the invention to provide, inter alia, a substrate, like a display screen of a cathode ray tube, carrying a coating, said coating providing an effective shield against electromagnetic radiation and exhibiting good optical properties, such as a transmission of at least 60% in the wavelength range of from 400 to 600 nm. Preferably, the layer must be compatible with additional antireflective layers. A further object of the invention is to provide a simple method of manufacturing such light transmissive well-conducting coatings, and it must be possible, in particular, to carry out said method at relatively low temperatures (maximally 160° C.) at which no damage is caused to parts of a cathode ray tube.

These objects are achieved by a coated substrate as described in the opening paragraph, which is characterised according to the invention in that the coating is a mixed organic conductive polymer/transparent metal oxide coating having a layer thickness between 100 and 600 nm and a sheet resistance of less than 1 k$\Omega/\square$. Depending on the thickness and/or the transparent metal oxide amount the sheet resistance can be between 100 and 600 $\Omega/\square$. In accordance with the above-mentioned requirements, such a layer provides an excellent shield against electromagnetic fields. In addition, the composition of the coating is such that it can exhibit a transmission in excess of 60% in the wavelength range of from 400 to 700 nm. Metal oxides, like $TiO_2$, and in particular $SiO_2$ are suited for use in the mixed conductive polymer/transparent metal oxide coating.

The much lower sheet resistance of the coating in accordance with the invention as compared to the known coating is obtainable by the method of preparing the coating as described hereinbelow.

An electroconductive coating in accordance with the invention, optionally with one or more additional scratch resistant layers can also suitably be used as a touch screen coating on a CRT or LCD display screen. By touching a certain part of the touch screen coating on the display screen, a local change in resistance is induced which is translated, via electronic controls, into a localisation and a subsequent action, such as opening a menu, turning pages etc. It is alternatively possible to write on the display screen with a pen, whereafter the writing is identified and processed.

For the additional layer use can possibly be made of a silicon dioxide layer having a thickness of from 50 to 250 nm. Using a tetraalkoxysilane, such as TEOS, as the precursor, such a layer can be provided in a simple manner by means of a sol-gel process, followed by curing at a relatively low temperature (≦160° C.).

The object of providing a simple method of manufacturing a transmissive electroconductive coating on a substrate (like a display screen of a cathode ray tube) is achieved in an embodiment in that the coating is manufactured by applying a layer of a solution of 3,4-ethylene dioxythiophene and an Fe(III) salt on the substrate, whereafter a treatment at an increased temperature is carried out, thereby forming a layer comprising poly-3,4-ethylene dioxythiophene and an Fe(III) salt, after which the layer is rinsed with an ethanolic metal oxide precursor, such as a $SiO_2$ precursor (e.g. a tetra alkoxy silane like TEOS) which is capable to extract Fe salts, thereby forming the electroconductive coating. Optionally an organic base can be added, a.o. to stabilise the system.

In general, polymers are slightly soluble in solvents such as alcohols. In order to obtain a processable polymeric solution, in the known method the polymerisation reaction is carried out in the presence of a large quantity of a stabilising polymer, such as polystyrene sulphonic acid. Said polymer, however, leads to an increase of the sheet resistance. In the method in accordance with the invention, instead of a solution of the polymer, a solution of the monomer is provided on the surface of the display screen. The monomer 3,4-ethylene dioxythiophene is subsequently converted to the polymer. The monomer 3,4-ethylene dioxythiophene is converted to the corresponding polymer by means of oxidation with an Fe(III) salt. Fe(III) salts are very suitable because of the redox potential ($E_{red}$=0.77 V at room temperature) which is very favourable for this reaction. Fe(III) salts of organic sulphonates are very suitable because of their high solubility in alcohols and low crystallisation rate in the liquid layer to be provided. Examples of said salts are Fe(III)-p-toluene sulphonate and Fe(III)-ethylbenzene sulphonate.

Solutions of 3,4-ethylene dioxythiophene monomers and Fe(III) salt, which is necessary for the polymerisation reaction, are instable. When said components are mixed, a polymer soon forms in the solution, as a result of which the pot-life of the coating solution becomes impractically short. Surprisingly, it has been found that the reaction rate of the polymerisation reaction is decreased by adding small quantities of a soluble organic base to the coating solution. Dependent upon the concentration of the base, the reaction at room temperature can be suppressed completely. In the case of an efficacious base concentration, solutions comprising monomers and the Fe(III) salt can remain stable at room temperature for at least 24 hours: polymerisation is not apparent within this time period. These stable solutions can be used to apply thin layers to the display screen by, for example, spin coating. After heating of the layer, electroconductive poly-3,4-ethylene dioxythiophene is formed. Besides, it has been found that the addition of the organic base has a favourable effect on the conductivity of the polymer and hence on the sheet resistance of the conductive coating. Presumably, the organic base forms a complex with the Fe(III) salt, which results in a reduction of the redox potential at room temperature. This leads to a reduction of the reaction rate, so that a more controlled polymerization at an increased temperature takes place and the specific electrical conductivity increases by approximately a factor of two.

Suitable soluble bases for this method include, for example, imidazole, dicyclohexylamine and 1,8-diazabicyclo[5.4.0]undec-7-ene (DBU).

Said compounds can readily be dissolved in various alcohols, such as isopropanol and 1-butanol. A solution of said compounds, for example, in 1-butanol is used as the coating solution and has a pot-life of approximately 12 hours. Preferably, before the coating solution is used, it is filtered over an 0.5 μm filter.

The coating solution can be provided on the substrate, like a CRT or LCD display screen, by means of customary methods, such as spraying or atomising. The solution is preferably spin coated onto the display screen. This results in a smooth, homogeneous and thin layer. During spin coating, the layer provided is dried and subsequently heated to a temperature of maximally 160° C. by means of a furnace, a jet of hot air or an infrared lamp. At a temperature between 100 and 150° C., the polymerisation reaction is completed within 2 minutes. The increased temperature initiates the polymerisation reaction in which the Fe(III) salt is converted to the corresponding Fe(II) salt. The colour of the coating changes from yellow to blueish green. The eventual thickness of the coating depends on the number of revolutions during spin coating and on the concentration of the dissolved compounds.

Removal of The Fe(III) and Fe(II) salts prevents the polymerised coating from becoming a dull layer as a result of crystallisation. In addition, the Fe(II) salt leads to an increase of the sheet resistance of the coating by a factor of ten. The Fe salts are removed by rinsing the coating with a suitable solvent. In this process, the Fe salts are extracted from the coating. Surprisingly, rinsing with an ethanolic $SiO_2$ precursor like TEOS results in a mixed Polymer/$SiO_2$ layer having attractive optical (anti-reflective) and electrical properties.

These and other aspects of the invention will be apparent from and elucidated with reference to the embodiments described hereinafter.

BRIEF DESCRIPTION OF THE DRAWINGS

In the drawings:

FIG. 5 is a diagram presenting the reflection $R_f$ (in absolute percent) of a coating made in accordance with the inventive method with a thickness of approximately 300 nm, corresponding to a ¾λ layer, FIG. 6 schematically shows a partly cut-away view of an embodiment of a CRT having a panel substrate carrying a light transmissive low ohmic coating according to the invention.

DESCRIPTION OF THE PREFERRED EMBODIMENT

The object of the invention is the use of an organic conductive polymer for an electric shielding coating applicable e.g. on the front of a CRT. The coating must fulfil the TCO requirements for a CMT monitor on AEF. This requirement translates into a sheet resistance of less than 1 kΩ.

To come to a low ohmic coating, several methods are known. It has been shown that a conductive ITO (indium tin oxide) layer of 100 Ω can be deposited on glass substrates by spray pyrolysis. The substrate is heated to a temperature up to 500° C. Instead of spray pyrolysis also spinning techniques can be used. A curing step of 400–500° C. is necessary to form the $Sn:In_2O_3$ lattice. Only rapid thermal annealing techniques like laser curing are able to anneal coated tubes.

This invention deals with a different approach, i.e. the use of conductive polymers. Among the conductive polymers, polythiophenes have attracted growing interest. Polythiopene and its derivates are the first class of polymers which are chemicals and electrochemical stable in air and moisture. They are also transparent so they can be used as optical coatings.

The starting materials are EDOT (ethylene-dioxythiophene) and iron(III)-toluene sulphonate $(Fe(TOS)_3)$. In the present application chemical polymerisation take place on the surface of the CRT or other transmissive substrate. This invention describes the processing of a $PEDOT/SiO_2$ hybrid having electric shielding and anti-reflective properties.

Processing

As mentioned before, the processing is based on the chemical polymerisation of EDOT to PEDOT. $Fe(TOS)_3$ is used as a oxidising agent, butanol is used as solvent. The EDOT solution is applied by spin coating. To polymerise EDOT, a heat treatment is necessary. The Fe-salt is removed from the coating. Water or ethanol rinsing can be used. A layer thickness difference of a factor 10 to 20 between the unrinsed and rinsed coating was observed. During this step the PEDOT chains are compacting. To process PEDOT to a hybrid polymer/$SiO_2$ system, the invention makes use of this behaviour by rinsing materials like TEOS (tetra ethyl ortho silicate) solution.

To initiate the polymerisation, the substrate temperature is an important parameter: the higher this temperature the faster the polymerisation starts. Preferably a temperature between 30 and 50° C. is chosen since at higher temperatures spinning problems might occur. Once the polymerisation has started, it accelerates itself.

In a particular process the conditions are as follows: the surface of the tube is heated by use of IR radiation (400 K) to 35–40° C. The EDOT solution is applied at 200 rpm. After the film has dried, a reaction time of 2 minutes is needed. Subsequently, an ethanolic TEOS solution is applied at 400 rpm. The coating is cured in an oven for 20 minutes at 160° C.

Optical Properties

Figure 3:
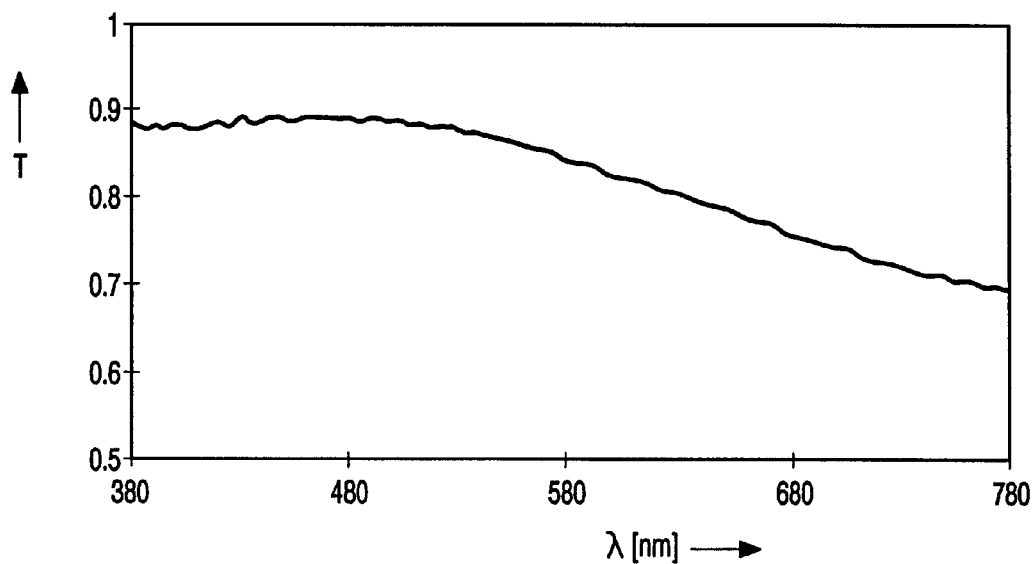
FIG. 3 shows the transmission spectrum of a coating in accordance with the invention.

The optical properties of the inventive coating, given by its transmission coefficient and its reflection coefficient, respectively, are plotted in FIGS. 3 and 5.

The concentration of the used TEOS solution determines the optical properties of the hybrid layer. Various TEOS solutions were used. The optical properties and layer thicknesses were measured by use of a Monolight spectrophotometer and an Alpha step 500 surface profiler (Tencor Instruments).

Figure 4:
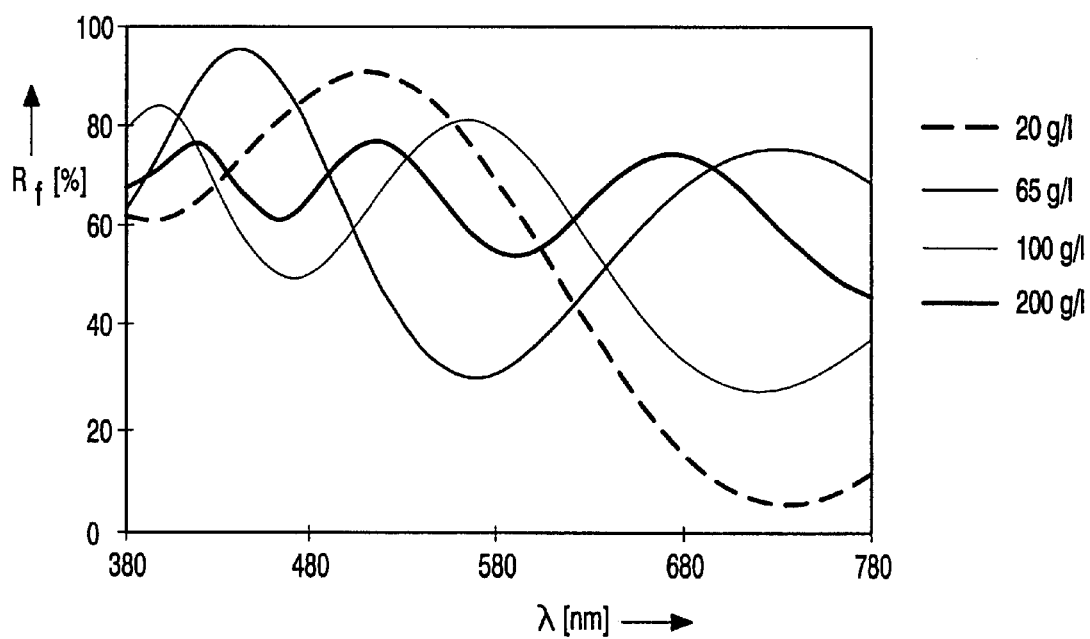
FIG. 4 shows the reflection $R_f$ (in percent of reflection by an uncoated surface) of coatings in accordance with the invention as a function of the TEOS concentration during rinsing.

In FIG. 4 the reflection $R_f$ in percentage of the reflection of an uncoated substrate is plotted as function of the wavelength for various TEOS concentrations. The transmission spectra did not change dramatically, indicating that the amount of PEDOT is constant, as expected.

Incorporating $SiO_2$ in the PEDOT layer results in a change of the index of refraction. In first order approximation the optical constants for the $PEDOT/SiO_2$ mixed organic conductive polymer/transparant metal oxide layer is an average n (index of refraction) and k (absorption coefficient) for both materials weighted as volume fraction.

$$n(\lambda)=V_{SiO2}.n(\lambda)_{SiO2}+V_{PEDOT}.n(\lambda)_{Pedot}$$

$$k(\lambda)=V_{SiO2}.k(\lambda)_{SiO2}+V_{PEDOT}.k(\lambda)_{Pedot}$$

$$V_{SiO2}+V_{PEDOT}=1$$

$$k(\lambda)_{SiO2}=0$$

To estimate the index of refraction we have calculated $n(\lambda)$ an $K(\lambda)$ for different volume fractions of PEDOT.

We have analysed the reflection spectra as plotted in FIG. 4 with the optical modelling soft-ware programme. The result were inconsistent with double layers and consistent with a single-layer mixed coating, the calculated thickness corresponding well with the measured layer thickness (see table 1). Based on these results we concluded that we have a single-layer mixed coating.

TABLE 1 results of the optical calculations.

| TEOS (g/l) | Measured thickness [nm] | calculated thickness [nm] | volume fraction PEDOT % |
|---|---|---|---|
| 20 | 190 | 200 | 75 |
| 65 | 310 | 315 | 45 |
| 100 | 400 | 410 | 35 |
| 200 | 550 | 540 | 25 |

The used TEOS concentration determines the ratio $PEDOT/SiO_2$ in the layer and thus the index of refraction. A higher TEOS concentration results in a higher volume fraction of the $SiO_2$.

FIG. 5 shows the reflection $R_f$ (in absolute percent) of a coating with a thickness of approximately 300 nm which corresponds to a coating having an optical thickness of ¾ of the average wavelength of visible light (approximately 580 nm). This is a preferred embodiment because the reflection $R_f$ is most efficiently reduced in the part of the visible light for which the human eye is most sensitive.

These calculations give an indication about the composition of the layer. For more exact information one can make use of other optical techniques like ellipsometric analysis, supported by chemical analysis to find out the chemical composition of the layer.

Electrical Properties

In table 2, the measured sheet resistance, layer thickness and the calculated specific conductivity are given.

TABLE 2 measured layer thicknesses and sheet resistances.

| TEOS [g/l] | d [nm] | $R_S$ [Ω] | ρ [S/cm] |
|---|---|---|---|
| 20 | 190 | 194 | 270 |
| 65 | 310 | 284 | 113 |
| 100 | 400 | 264 | 94 |
| 200 | 550 | 396 | 46 |

In this table:
d = measured layer thickness

TABLE 2-continued measured layer thicknesses and sheet resistances.

| TEOS [g/l] | d [nm] | $R_S$ [Ω] | ρ [S/cm] |
|---|---|---|---|

$R_S$ = sheet resistance
ρ = specific conductivity = $1/[R_S \cdot d(cm)]$

Exemplary Embodiment 1

Figure 1:
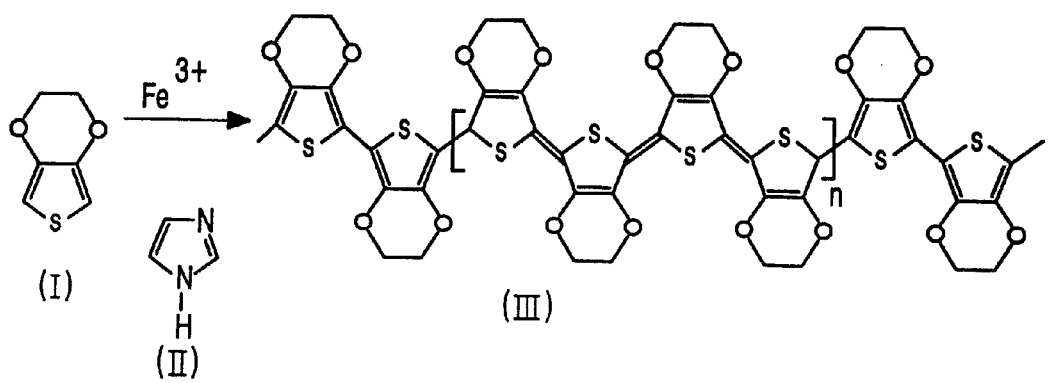
FIG. 1 shows the reaction scheme of the preparation of electroconductive poly-3,4-ethylene dioxythiophene (formula III) using 3,4-ethylene dioxythiophene (formula I) as the starting material.

In 70 g 1-butanol there is dissolved:

10 g (0.0176 mol) Fe(III)-p-toluene sulphonate 1.0 g (0.007 mol) 3.4-ethylene dioxythiophene (formula I in FIG. 1, supplier Bayer AG)

0.4 g (0.0059 mol) imidazole (formula II in FIG. 1, supplier Aldrich)

Figure 2:
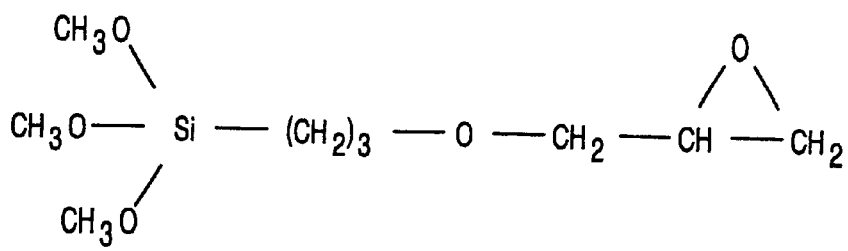
FIG. 2 shows the structural formula of 3-glycidoxypropyl-trimethoxysilane.

0.05 g (0.00021 mol) 3-glycidoxypropyl-trimethoxysilane (FIG. 2, supplier Hüls).

The above-mentioned Fe(III) salt was provided by Bayer. After filtration over a polyamide filter of 0.5 μm, the coating solution is ready. Due to the presence of imidazole, the polymerisation reaction is suppressed and the pot-life of the solution is at least 24 hours.

A quantity of 30 ml of this solution is applied to a rotating display screen with a diagonal of 38 cm (15 inches). The solution is applied by spinning at a rate of 150 revolutions per minute. At this number of revolutions, the applied layer is subsequently dried for 1 minute.

The monomer is converted to the corresponding electro-conductive polymer (formula III in FIG. 1) by heating the layer to 150° C. in a furnace for 1 minute. In this process, the colour of the layer changes from yellow to blueish green. This relatively low temperature is safe for the components of the display tube.

The layer is subsequently rinsed with TEOS (tetra ethyl orthosilicate) thereby extracting the Fe(II) salts formed and the remaining Fe(III) salts. After drying of the coating, it has a layer thickness of 300 nm.

The transmission spectrum of the layer obtained is shown in FIG. 3. The transmission T (in percent) is plotted as a function of the wavelength λ (in nm). The layer has a high transmission in the blue wavelength range and becomes slightly absorptive of from 500 nm. Between 400 and 650 nm, the transmission is at least 80%.

Table 3 lists some mechanical properties like pencil hardness and abrasion resistance. The pencil hardness is measured according to DIN 5350 and MIL 27227. The abrasion resistance is determined by use of an eraser, giving it 20 strokes of approximately 5 cm with a 1 kg load along the coated surface.

TABLE 3 measured mechanical properties.

| TEOS [g/l] | d [nm] | pencil hardness | abrasion resistance |
|---|---|---|---|
| 20 | 190 | ~H1 | ~ |
| 65 | 310 | H3/H4 | + |
| 100 | 400 | H4/H5 | + |
| 200 | 550 | H5/H6 | + |

+ = good
~ = acceptable

Tables 2 and 3 show that the applied mixed coating on the substrate (e.g. a face plate of a CRT) will reduce the alternating electric field strongly, while the mechanical properties are sufficient for normal use.

Figure 6:
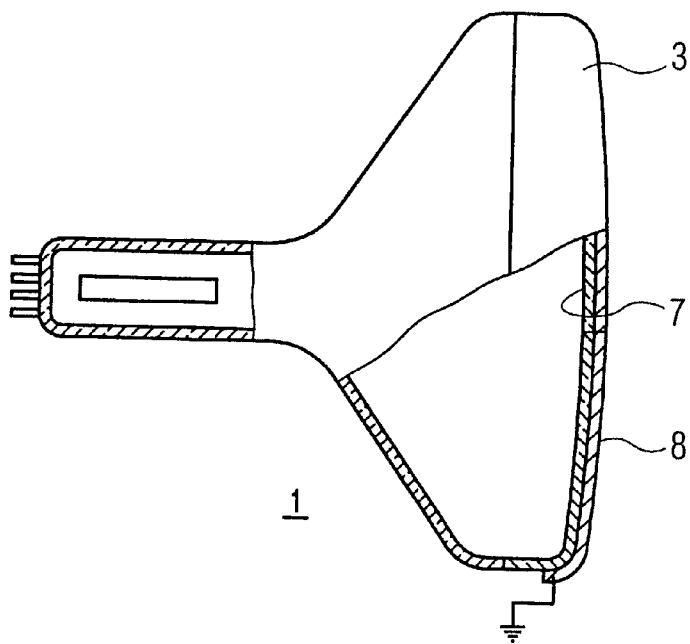

FIG. 6 schematically shows a partly cut-away view of an embodiment of a CRT 1 having a panel substrate carrying a light transmissive low ohmic coating according to the invention. A phosphor layer is applied to the inside 7 of the display screen 3. An electroconductive coating 8 is applied on the outside of the display screen 3.

Figure 7:
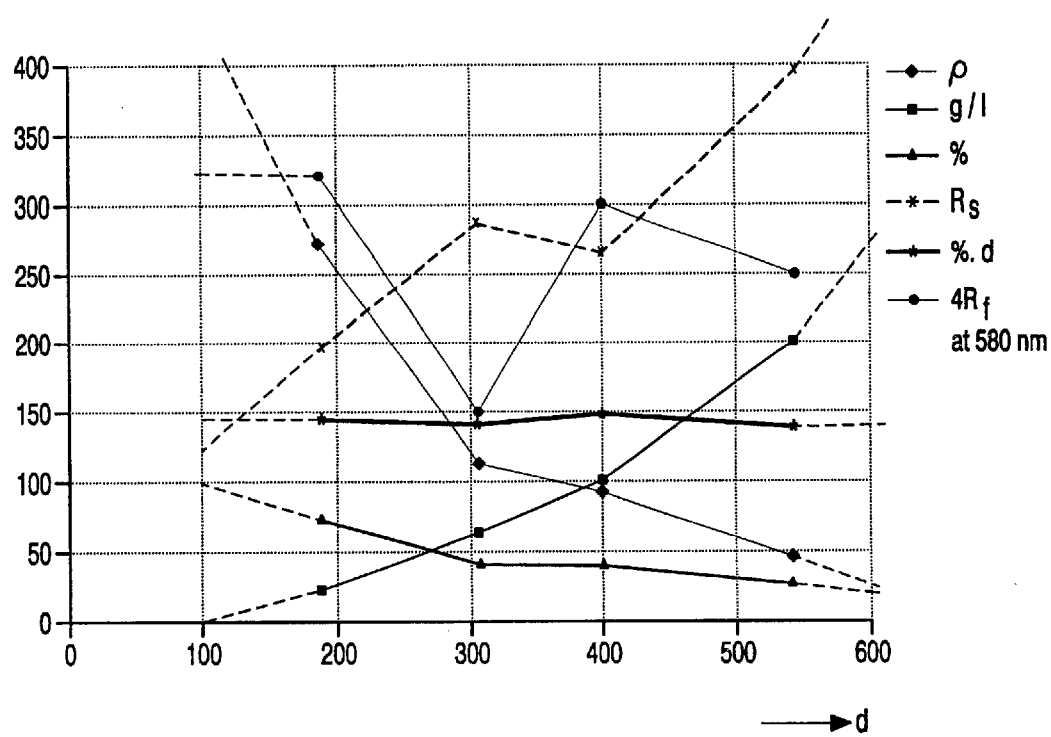
FIG. 7 shows in a graphical form a number of features of a coating in correspondence with the invention as a function of the thickness d of the coating.

FIG. 7 summarises in a graphical form the different features, namely ρ, g/l, % PEDOT, $R_S$, %.d and $4R_f$ at 580 nm as a function of the thickness d. To obtain a full overview of the properties of the coating the properties of table 3 above should also be taken into consideration. FIG. 7 also shows extrapolated values.

For thicknesses of φnm the amount of conductive polymer becomes so great (near 100%) that the mechanical properties are insufficient for normal use (see table 3 and the trend shown in table 3). For thicknesses higher greater than 600 nm the amount of conductive polymer becomes so small that the conductivity becomes too small and $R_s$ rises above the indicated values. The values for $4R_f$ show a remarkably low value around 300 nm, i.e. for ¾λ layer.

Summarizing

Chemical polymerisation of EDOT and Fe(III)toluene sulphonate on the face plate of a CRT is possible. Rinsing out the Fe-salt with a solution results in a mixed PEDOT/$SiO_2$ layer with a sheet resistance of less that 1 KΩ, in particular less than 600 Ω. This value is low enough to fulfil the TCO requirements concerning the alternating electric field. This rinsing method can also be used to produce mixed PEDOT/transparent metal oxides layers in general. E.g. Metal oxides like $SiO_2$ and/or $TiO_2$ can be incorporated in the PEDOT layer in this manner.

The optical properties (n, k) of the hybrid layer are appropriate to design an anti reflective coating. The reflection minimum of this 1-layer system is approximately 1.5% which is obtained when a ¾λ layer (a layer with an optical thickness n.d of approximately ¾ 0.580 nm=435 nm (in general between 380 and 490 nm) ) is used.

The mechanical properties of this layer are acceptable; depending on the TEOS concentration the pencil hardness may range from H1 to H3/H4 to H5/H6 and the abrasion resistance is sufficient.

Curing this layer is possible up to 170° C. Higher curing temperatures are not recommended because this results only in a faster degradation and will not improve the mechanical properties significantly.

The above given exemplary embodiments, though some of these form preferred embodiments are not restrictive. Within the conept of the invention variations are possible. For instance, instead of a TEOS rinsing solutions a TEOTi (tetra ethyl ortho titanate) rinsing solution can be used. The following example is given:

| | |
|---|---|
| Pedot solution: | 25 gr Fe(TOS)$_3$ |
| | 60 gr butanol |
| | 0.2 gr epoxysilaan |
| | 1 gr EDOT |
| TEOTi solution: | 90 gr ethanol |
| | 8.3 gr HCl 6N |
| | 26.3 gr TEOti |
| | hydrolize for 5 minutes then add 288 gr ethanol |
| Process: | Spin PEDOT solution at 200 rpm at 37° C. |
| | Polymerise for 5 minutes |
| | Spin TEOTi solution at 300 rpm |
| | Followed by curing for 30 minutes at 160° C. |

Figure 8:
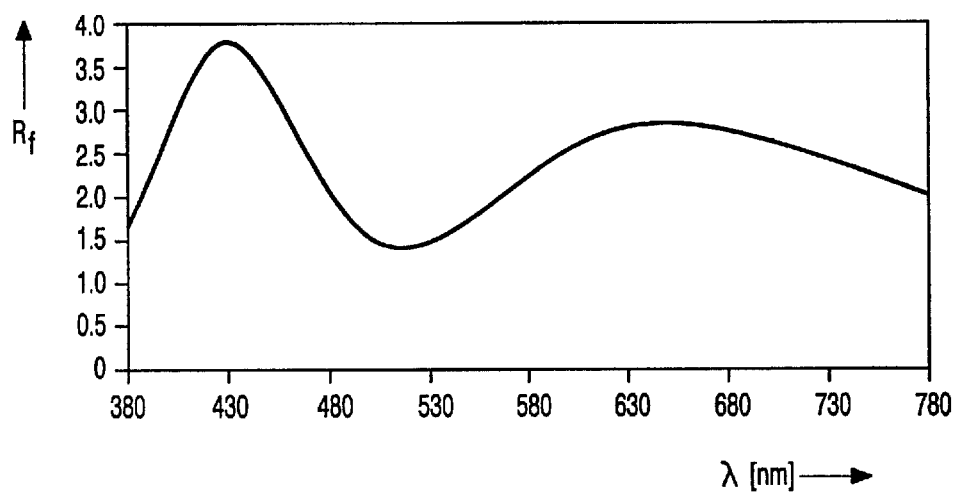
FIG. 8 is a diagram presenting the reflection $R_f$ (in absolute percent) of a coating made in accordance with the inventive method in which is rinsed with a TEOTi solution.

FIG. 8 shows the resulting reflection $R_f$ in absolute percentage of the resulting coating. The reflectance is strongly reduced and shows a minimum of approximately 1.5% between 480 and 580 nm.

What is claimed is:

1. Light transmissive substrate carrying a light transmissive low ohmic coating, wherein the coating is a mixed organic conductive polymer and transparent metal oxide coating having a layer thickness between 100 and 600 nm and a sheet resistance of less than 1 K$\Omega$/□.

2. Substrate as claimed in claim 1, wherein the organic conductive polymer is selected from the group consisting of polythiophene and its derivatives.

3. Substrate as claimed in claim 1, wherein the coating comprises between 10 and 90 vol. % of the organic conductive polymer.

4. Substrate as claimed in claim 1, wherein the coating, alone or in combination with a transparent further coating, forms an antireflex filter.

5. Substrate as claimed in claim 1, wherein the coating forms a ¾ □ stack.

6. Substrate as claimed in claim 1, in which the coating is a mixed organic conductive polymer and $SiO_2$ coating.

7. Display device comprising a substrate as claimed in any of the preceding claims.

* * * * *